(No Model.) 2 Sheets—Sheet 2.
H. GROSWITH.
METHOD OF OPERATING ELECTRIC MOTORS.
No. 441,954. Patented Dec. 2, 1890.
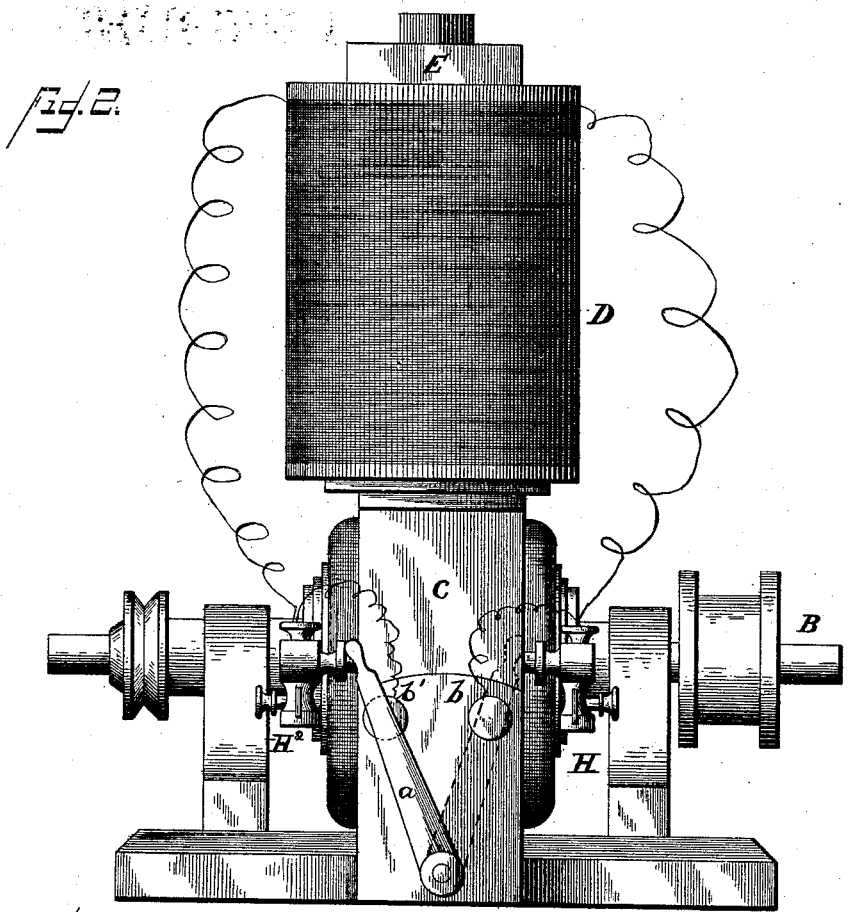
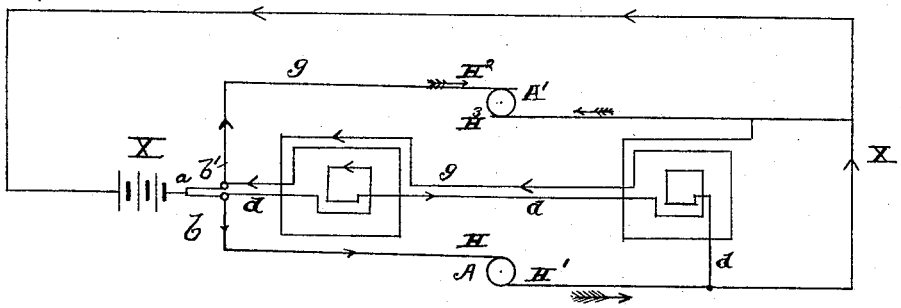
WITNESSES:
INVENTOR:

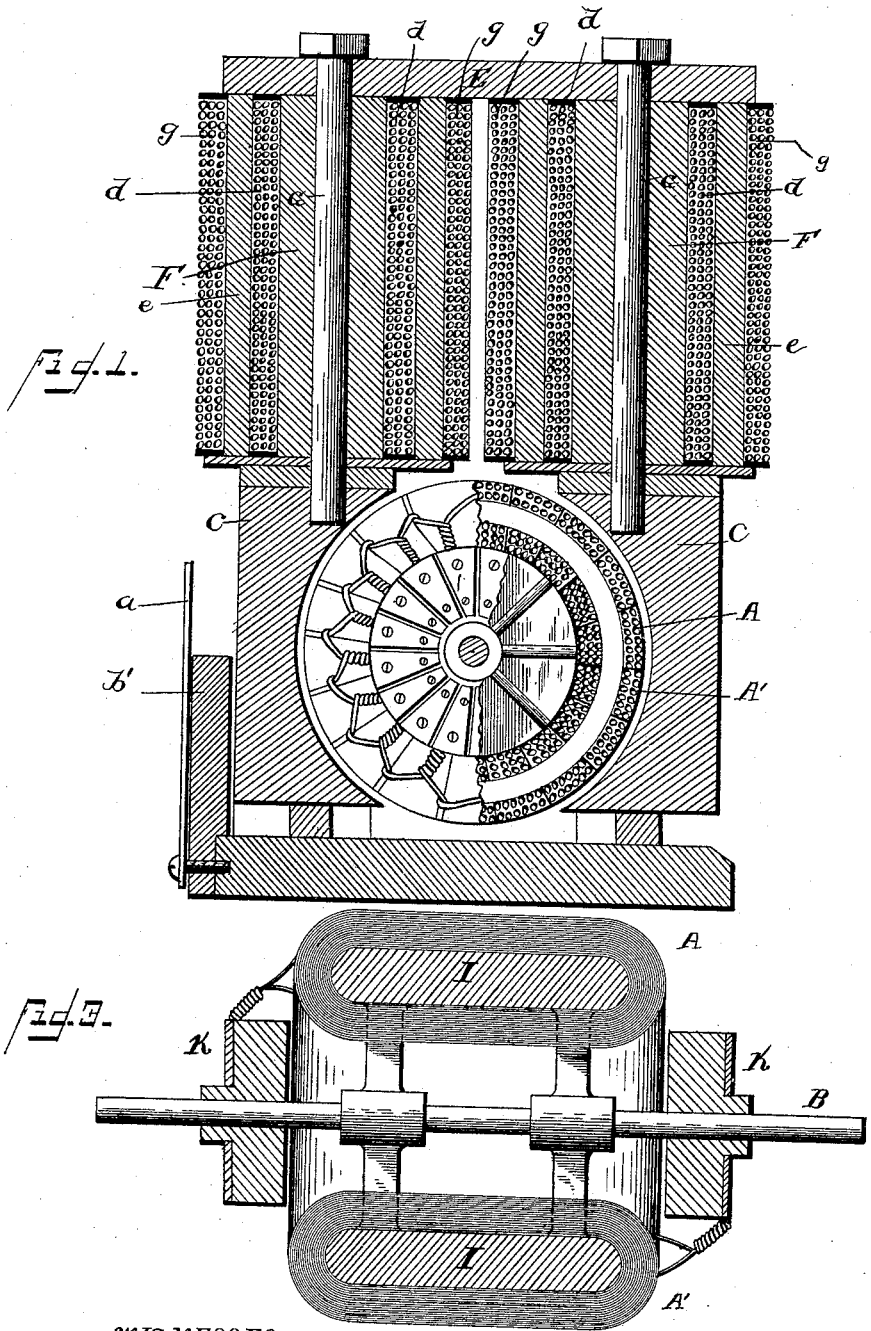

UNITED STATES PATENT OFFICE.

HENRY GROSWITH, OF PHILADELPHIA, PENNSYLVANIA, ASSIGNOR, BY DIRECT AND MESNE ASSIGNMENTS, TO THE KENNEDY-GROSWITH ELECTRIC COMPANY, OF SAME PLACE.

METHOD OF OPERATING ELECTRIC MOTORS.

SPECIFICATION forming part of Letters Patent No. 441,954, dated December 2, 1890.

Application filed March 5, 1890. Serial No. 342,815. (No model.)

*To all whom it may concern:*

Be it known that I, HENRY GROSWITH, a citizen of the United States, and a resident of Philadelphia, in the county of Philadelphia and State of Pennsylvania, have invented certain new and useful Improvements in Methods of Operating Electric Motors; and I do hereby declare that the following is a full, clear, and exact description of the invention, which will enable others skilled in the art to which it appertains to make and use the same.

My invention consists in certain improvements in methods of operating electric motors, whereby such currents are employed or used as an auxiliary means for energizing the field-magnets of the motor.

In the accompanying drawings illustrating one form of apparatus for carrying my invention into effect, Figure 1 is a vertical sectional view of the motor. Fig. 2 is an end view of the same. Fig. 3 is a sectional view of the armature. Fig. 4 is a diagrammatic view showing the circuit through the field-magnets, armature, and induction-coils.

In the said drawings, the reference-letter A designates the armature-coil; A', the induction-coil; B, the armature-shaft; C, the pole-pieces; D, the field-magnets, and E the yokes connecting the cores of said magnets.

The field-magnets are exact duplicates of each other, and are constructed as follows: I first take the cylindrical cores F F, having axial bores or apertures for the reception of the bolts G, by which they are connected, respectively, at opposite ends to the yoke-plate E and pole-pieces C. Next I wind each of these cores with the wire $d$ until the proper thickness has been attained, and connect one terminal of said wire with switch-plate $b$, and by means of switch-lever $a$ connect with dynamo or generator, and the other terminal with the armature-brush $H^2$, connected with return conductor or wire $x$, leading back to generator. Around this "primary" core I next form a "secondary" core of soft iron $e$, of proper thickness, and then wind with wire $g$. The said cores are then magnetically connected by means of the yoke E. One of the terminals of wire $g$ is connected with other switch-plates $b'$, while the other terminal is connected with the brush $H^3$ of the induction-coil (more fully shown in Fig. 4) and with wire $x$.

The letter I designates the armature-core, and K K the commutator-plates. These are of the usual construction, except that the commutator-plates are placed on each side of the machine, and each is provided with its own brushes H H' $H^2$ $H^3$.

The armature and induction coils consist of a number of separate wires wound upon the core, and the terminals of each series or alternate coils being electrically connected and joined to the commutator-bars upon one side of the machine, while the terminals of the other series are suitably united and joined to the other commutator-bars. There are thus formed two sets of separate and distinct coils electrically disconnected from each other, one of which A forms the armature-coil through which the current from the generator passes to energize it, while the other is an induction-coil by which the currents induced in the armature-coil are carried away by brush $H^2$, and by means of wire $g$ connected with said brush they pass through said wire around the cores of the field-magnets, and from thence back through brush $H^3$, thus assisting in energizing the field-magnets, whereby their power is increased.

The circuit is as follows: from generator to switch-lever $a$, plate $b$, wire $d$, around primary cores of field-magnets, to brush H', and conductor $x$ to generator; also from plate $b$ through armature A, and from armature by brush H' to conductor $x$ and generator. At the same time the induced currents from the induction-coil flow through brush $H^2$ to wire $g$, thence around the secondary cores of the field-magnets, and from thence back through brush $H^3$, thus materially increasing the effectiveness of the said magnets, as will be apparent. By shifting switch-lever $a$ over to switch-plate $b'$ the direction of the currents in the field-coils is changed and the operation of the motor reversed, the armature-coil A now becoming the induction-coil, and vice versa. The main or motor current now flows through armature-coils A″ and field-wire $g$, and from these to wire $x$ and back to the generator.

From the above it will be seen that I utilize the inductive effects of both field and motor current in increasing the effect of the field-magnets, and at the same time materially reduce the sparking due to self-induction in the armature-wire. I also produce a ready and simple reversing device and a quickly-reversing machine.

Having thus described my invention, what I claim is—

1. In an electric motor, the combination of an armature-core wound with two sets of coils, two commutators, brushes, a field-magnet having two sets of coils, one terminal of each set being connected to one brush of its respective commutator and to a common conductor, and the other terminal of each set of field-coils being connected to the other corresponding brush and to a contact or binding post for external connection.

2. An electric motor having a set of field-coils, armature-coils, and commutator in one circuit, a duplicate set of elements, a common external connection to one brush of each commutator, and a pair of contacts or binding-posts connected, respectively, to the two other brushes for external connection.

In testimony that I claim the foregoing as my own I have hereunto affixed my signature in presence of two witnesses.

HENRY GROSWITH.

Witnesses:
MARY H. BYAN,
C. H. COCHRAN.